US012559330B2

(12) United States Patent
Poloniewicz

(10) Patent No.: US 12,559,330 B2
(45) Date of Patent: Feb. 24, 2026

(54) LOADING OPERATION MONITORING APPARATUS AND METHOD OF USING THE SAME

(71) Applicant: Hand Held Products, Inc., Charlotte, NC (US)

(72) Inventor: Paul R. Poloniewicz, Waxhaw, NC (US)

(73) Assignee: Hand Held Products, Inc., Charlotte, NC (US)

( * ) Notice: Subject to any disclaimer, the term of this patent is extended or adjusted under 35 U.S.C. 154(b) by 538 days.

(21) Appl. No.: 18/055,781

(22) Filed: Nov. 15, 2022

(65) Prior Publication Data

US 2024/0158189 A1    May 16, 2024

(51) Int. Cl.
*G06T 19/00* (2011.01)
*B65G 67/04* (2006.01)
(Continued)

(52) U.S. Cl.
CPC ........... *B65G 67/04* (2013.01); *G06Q 10/083* (2013.01); *G06T 7/62* (2017.01); *G06T 2207/10028* (2013.01); *G06T 2207/30268* (2013.01)

(58) Field of Classification Search
CPC . G06T 2207/10028; G06T 2207/30268; G06T 7/11; G06T 7/62; G06T 7/73; G06T 2200/04; G06T 2207/10012; G06T 2207/30204; G06T 2207/30208; G06T 2207/30241; G06T 2207/30244;
(Continued)

(56) References Cited

U.S. PATENT DOCUMENTS

| 10,311,315 B2 | 6/2019 | Drazan et al. |
| 10,896,327 B1 * | 1/2021 | Lablans ................. G06V 10/25 |

(Continued)

FOREIGN PATENT DOCUMENTS

| CN | 104880149 B | 8/2018 |
| CN | 109916302 B | 11/2020 |

(Continued)

OTHER PUBLICATIONS

Extended European Search Report Mailed on Apr. 16, 2024 for EP Application No. 23203460, 8 page(s).

*Primary Examiner* — Quan M Hua
(74) *Attorney, Agent, or Firm* — Alston & Bird LLP

(57) ABSTRACT

Various embodiments are directed to an apparatus for monitoring a loading operation, comprising: a movable body configured to be inserted in a loading space of a carrier during a loading operation and proximate to an upper portion of the loading space; an imaging device secured to the movable body, the imaging device configured to capture imaging data of the loading space, wherein the captured imaging data comprise a three-dimensional (3D) map of the loading space; a distance measuring device secured to the movable body, the distance measuring device configured for measuring a distance between the imaging device and a front wall of the loading space; and a controller configured to receive the imaging data captured by the imaging device, wherein the controller comprise one or more processors configured to detect a loading condition of the loading space of the carrier based at least in part on the imaging data.

15 Claims, 5 Drawing Sheets

(51) Int. Cl.
*G06Q 10/083* (2023.01)
*G06T 7/62* (2017.01)

(58) Field of Classification Search
CPC ........... G06T 2207/30248; G06T 7/194; G06T 7/246; G06T 7/254; G06T 7/593; G06T 7/70; G06V 20/59; G06Q 10/08; G06Q 10/04; G06Q 10/0639
See application file for complete search history.

(56) References Cited

U.S. PATENT DOCUMENTS

| | | | |
|---|---|---|---|
| 2015/0296105 A1* | 10/2015 | De Geeter ............ | B66C 19/002 |
| | | | 348/373 |
| 2018/0178667 A1 | 6/2018 | Cumoli et al. | |
| 2019/0197701 A1 | 6/2019 | Krishnamurthy et al. | |
| 2019/0197716 A1 | 6/2019 | Trajkovic et al. | |
| 2019/0327394 A1* | 10/2019 | Ramirez Luna ....... | A61B 34/77 |
| 2021/0374659 A1 | 12/2021 | Ganapathi et al. | |
| 2021/0406566 A1* | 12/2021 | Shankar ............... | G01C 21/005 |
| 2022/0108088 A1* | 4/2022 | Volkerink .......... | G06K 19/0723 |
| 2023/0319237 A1* | 10/2023 | Fujimaki .............. | G06T 19/006 |

FOREIGN PATENT DOCUMENTS

| | | | |
|---|---|---|---|
| CN | 216954628 U | 7/2022 | |
| DE | 102005001480 B3 | 10/2006 | |
| DE | 102020007155 A1 | 1/2021 | |
| EP | 1995206 A1 | 11/2008 | |
| EP | 3597490 B1 | 2/2022 | |
| KR | 10-2022-0095057 A | 7/2022 | |

\* cited by examiner

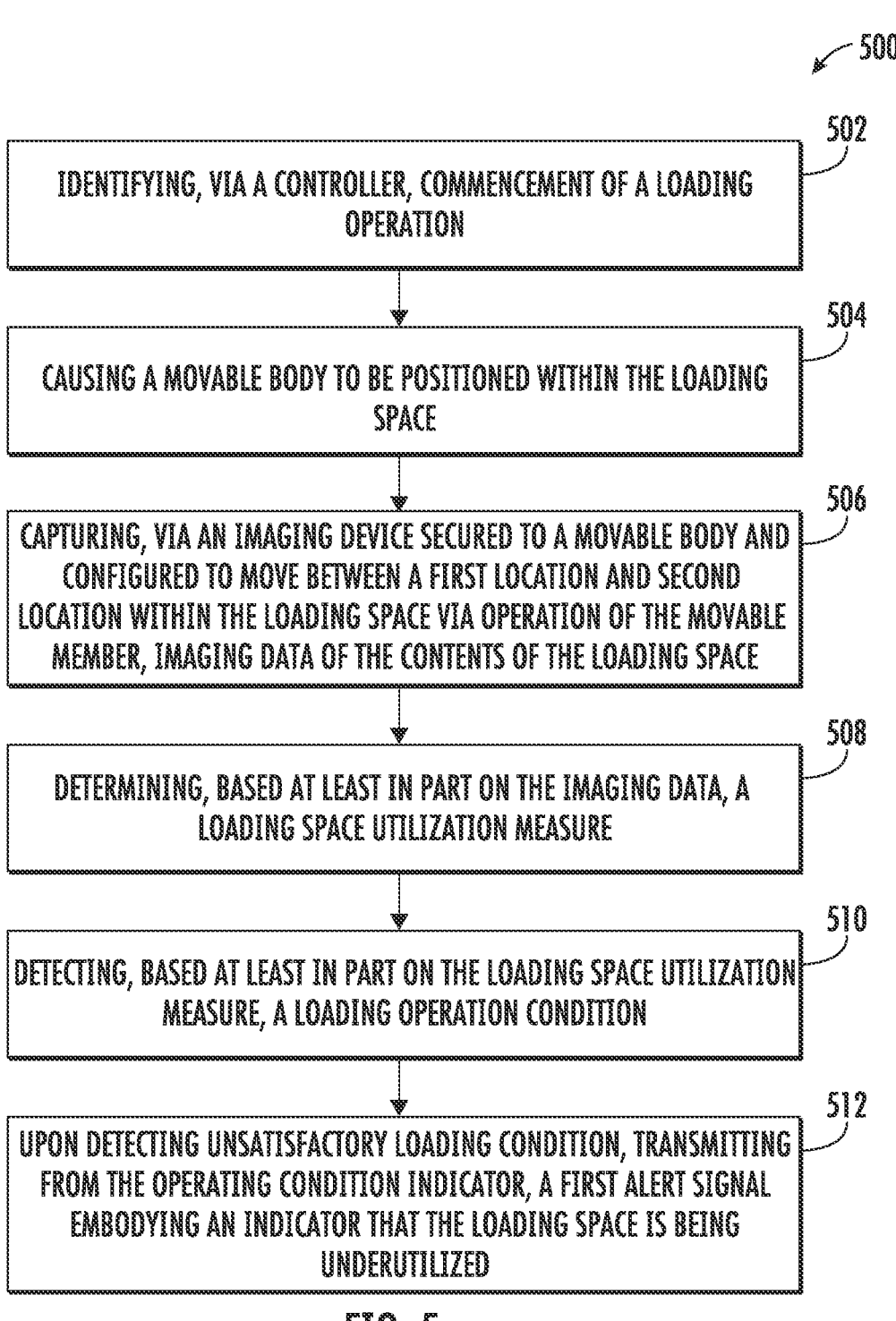

500

502

IDENTIFYING, VIA A CONTROLLER, COMMENCEMENT OF A LOADING OPERATION

504

CAUSING A MOVABLE BODY TO BE POSITIONED WITHIN THE LOADING SPACE

506

CAPTURING, VIA AN IMAGING DEVICE SECURED TO A MOVABLE BODY AND CONFIGURED TO MOVE BETWEEN A FIRST LOCATION AND SECOND LOCATION WITHIN THE LOADING SPACE VIA OPERATION OF THE MOVABLE MEMBER, IMAGING DATA OF THE CONTENTS OF THE LOADING SPACE

508

DETERMINING, BASED AT LEAST IN PART ON THE IMAGING DATA, A LOADING SPACE UTILIZATION MEASURE

510

DETECTING, BASED AT LEAST IN PART ON THE LOADING SPACE UTILIZATION MEASURE, A LOADING OPERATION CONDITION

512

UPON DETECTING UNSATISFACTORY LOADING CONDITION, TRANSMITTING FROM THE OPERATING CONDITION INDICATOR, A FIRST ALERT SIGNAL EMBODYING AN INDICATOR THAT THE LOADING SPACE IS BEING UNDERUTILIZED

FIG. 5

LOADING OPERATION MONITORING APPARATUS AND METHOD OF USING THE SAME

FIELD OF THE INVENTION

Various embodiments described herein relate generally to monitoring apparatus, and more particularly to loading operation monitoring apparatus.

BACKGROUND

Generally, the process of loading carriers, such as containers, trucks, trailers, tippers, and many other carriers is a manual operation that is performed at loading environments, including, but not limited to, commercial loading docks, private loading docks, and warehouses. Applicant has identified several technical challenges associated with monitoring devices for loading carriers. Through applied effort, ingenuity, and innovation, many of these identified challenges have been overcome by developing solutions that are included in embodiments of the present disclosure, many examples of which are described in detail herein.

BRIEF SUMMARY

Various embodiments described herein relate to apparatuses, methods, and systems for monitoring loading operations. Various embodiments are directed to an apparatus for monitoring a loading operation, comprising: a movable body configured to be inserted in a loading space of a carrier during a loading operation and proximate to an upper portion of the loading space; an imaging device secured to the movable body, the imaging device configured to capture imaging data of the loading space, wherein the captured imaging data comprise a three-dimensional (3D) map of the loading space; a distance measuring device secured to the movable body, the distance measuring device configured for measuring a distance between the imaging device and a front wall of the loading space; and a controller configured to receive the imaging data captured by the imaging device, wherein the controller comprise one or more processors configured to detect a loading condition of the loading space of the carrier based at least in part on the imaging data.

In various embodiments, the controller is further configured to monitor the loading operation of the loading space by at least substantially continuously capturing the imaging data.

In various embodiments, the controller is further configured to monitor the loading operation of the loading space by at least periodically capturing the imaging data.

In various embodiments, the movable body comprises an extendable beam, the imaging device is secured to a first end of the extendable beam, and the imaging device is configured to move via extension of the extendable beam.

In various embodiments, the movable body comprises a carriage secured to a beam, the carriage is configured to move along a length of the beam, and the imaging device is secured to the carriage and configured to move along a length of the loading space via movement of the carriage.

In various embodiments, the movable body comprises a flying object.

In various embodiments, the flying object comprise a drone.

In various embodiments, the distance measuring device comprise a range sensor.

In various embodiments, a field of view of the imaging device is orientated substantially perpendicular relative to a bottom wall of the loading space.

In various embodiments, a field of view of the imaging device is orientated substantially parallel relative to a bottom wall of the loading space.

In various embodiments, the controller is configured to: (i) determine a height of contents of a particular area of the loading space during the loading operation (ii) and in response to determining that the height of the contents of the particular area of the loading space satisfies a content height threshold: (a) determine that loading of the particular area of the loading space has been completed, and (b) cause the movable body when re-inserted into the loading space to move a second length that is less than a first length.

In various embodiments, the imaging device is a 3D camera configured to capture 3D point cloud images.

In various embodiments, the controller is configured to cause the imaging device to capture N number of images along a length of the loading space, wherein the N number of images is determined based at least in part on the distance between the imaging device and the front wall of the loading space.

In various embodiments, the controller is configured to determine a space utilization measure based at least in part on the imaging data, wherein the loading condition is detected based at least in part on comparing the space utilization measure to a space utilization threshold.

In various embodiments, the apparatus further comprises a loading condition indicator in electronic communication with the controller such that the loading condition indicator is configured to receive one or more indicator signals corresponding to the detected loading condition from the controller and, in response, transmit an alert signal corresponding to the detected loading condition based on the one or more indicator signals, the alert signal embodying an indicator of the detected loading condition.

In various embodiments, the controller is configured to process the imaging data captured by the imaging device by executing one or more machine learning operations.

Various embodiments are directed to a method for monitoring a loading operation, the method comprising: causing a movable body to be inserted in a loading space of a carrier during a loading operation; causing capturing of imaging data of the loading space, wherein the captured imaging data comprise a three-dimensional (3D) map of the loading space; and detect a loading condition of the loading space of the carrier based at least in part on the imaging data.

In various embodiments, the method further comprises monitoring the loading operation of the loading space by at least substantially continuously capturing the imaging data.

In various embodiments, the method further comprises monitoring the loading operation of the loading space by at least periodically capturing the imaging data.

In various embodiments, the imaging data is captured using a 3D camera.

BRIEF DESCRIPTION OF THE DRAWINGS

Reference will now be made to the accompanying drawings, which are not necessarily drawn to scale, and wherein:

FIG. 5 is an illustrative flowchart of various steps for an example method in accordance with various embodiments of the present disclosure.

DETAILED DESCRIPTION

Figure 1:
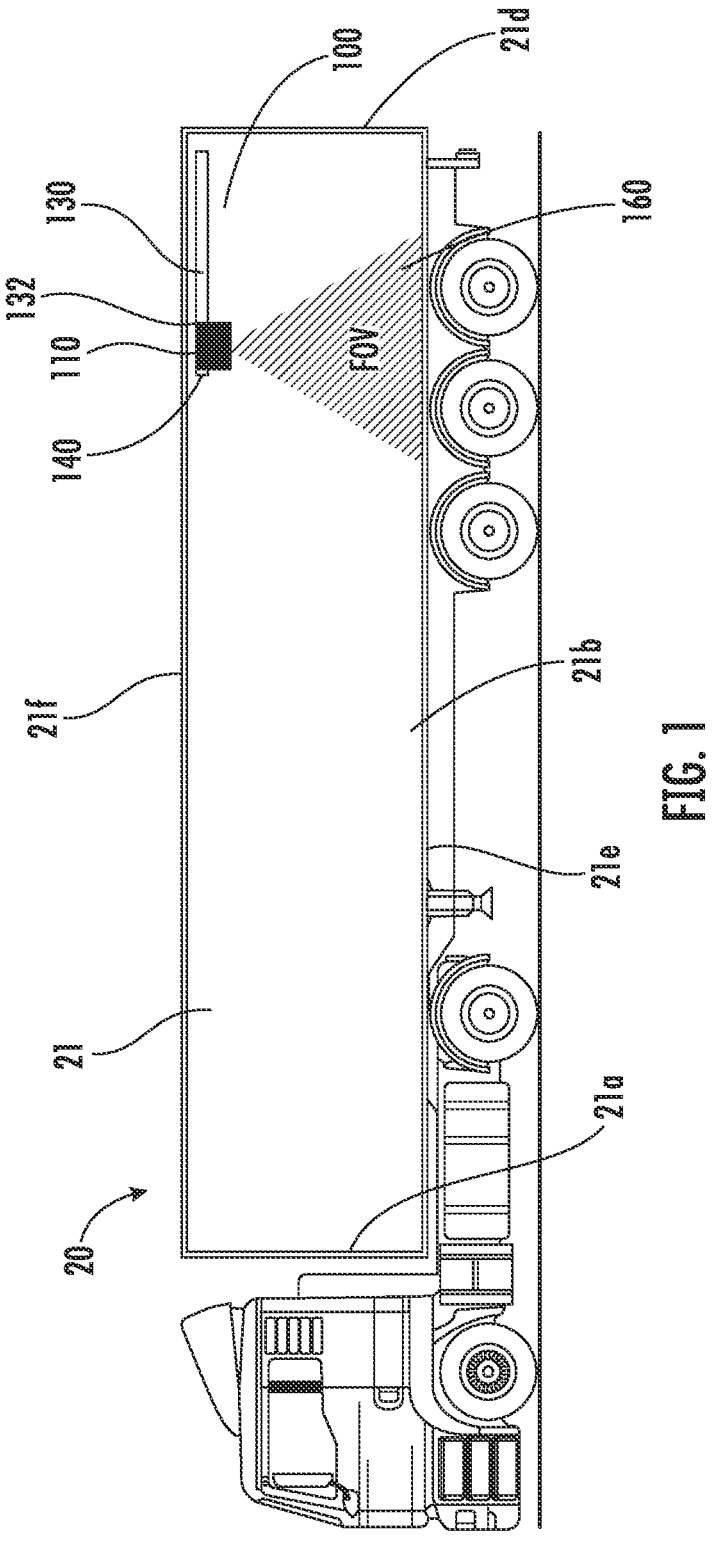
FIG. 1 illustrates a side view of an exemplary loading operation monitoring apparatus in operating configuration according to an example embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

In loading environments, (e.g., distribution centers, shipping centers, warehouses, factories, and/or the like), it is often desirable to maximize the loading space of carriers (e.g., containers, trucks, trailers, tippers, vans, and/or the like) that are used to transport various objects (goods, items, or similar terms) all over the country, and even all over the world. Generally, the process of loading carriers is a manual process that may involve stacking objects (e.g., boxes, pallets, bags, and/or the like) of various shapes and sizes within the loading space of the carrier. Often the loading space of carriers are underutilized at least in part due to the manual loading process and the variation in shape and size of objects loaded in carriers. Moreover, underutilization of the loading space of carriers typically results in, but not limited to, inefficient use of resources, increased cost, delayed shipments, and scheduling issues. Monitoring devices may be used to monitor and/or track utilization of the loading space of carriers. For example, monitoring devices may be permanently fixed within a loading space to monitor the loading process. However, installing monitoring devices in each carrier is uneconomical and may not be feasible for many reasons, including, but not limited to cost and logistics. Moreover, there are deficiencies associated with monitoring devices that are positioned outside relative to the loading space of a carrier. For example, monitoring devices positioned outside relative to a loading space may experience loss of visibility due to shadowing (e.g., when an object is placed in front of an unoccupied space), and thus unable to accurately monitor a loading operation of a carrier.

Various embodiments described herein are directed to apparatuses and methods for monitoring space utilizing of carriers associated with a loading operation. In various embodiments, the present disclosure includes a loading operation monitoring apparatus that is configured to be inserted (e.g., positioned) within a loading space of a carrier during loading of the carrier. In various embodiments, a loading operation monitoring apparatus may comprise an imaging device configured to capture imaging data associated with a loading space, a movable body configured to support the imaging device and to facilitate movement of the imaging device, a distance measuring device (e.g., a range sensor such as a laser range sensor) to detect the distance between the imaging device and a first location (e.g., reference point) associated with a loading space, and a controller configured to detect a loading condition of a loading space with respect to space utilization of the loading space based at least in part on imaging data captured by the imaging device. In various embodiments, the imaging device may comprise one or more sensors configured to scan the content of a loading space to generate imaging data that collectively represent a map of the loading space. The imaging device, for example, may comprise a 3D imaging device such as, but not limited to, a 3D camera, a 2D TOF camera, an opto-mechanical a LIDAR device (e.g., solid-state LIDAR device), a millimeter wave radar device, a structured light-based 3D camera (e.g., Auto Cube), a stereo camera system, or any suitable 3D mapping device that may be operably positioned within a loading space to capture imaging data.

As described herein, the movable body may be configured to be inserted into, driven into, flown into, or otherwise positioned within a loading space of a carrier during a loading operation. As further described herein, the movable body may be configured to be positioned proximate to an upper portion (e.g., ceiling) of the loading space of a carrier during a loading operation and may be configured to be positioned above relative to a height of the contents of a loading space during a loading operation thereof. Moreover, as described herein, the imaging device may be movable along the length of a loading space of a carrier, and imaging data captured by the imaging device may comprise one or more images of the contents of the loading space that may encompass the length of the loading space. In various embodiments, the movable body may be configured be re-inserted into a loading space one or more times during a loading operation and/or re-positioned one or more times during a loading operation based at least in part on the height of the contents of the loading space during portions of the loading operation. For example, in various loading environments, a loading operation may be performed incrementally (e.g., starting from the front of the loading space), where an area of the loading space is completed before completing an adjacent area of the loading space. Furthermore, in the noted example loading environments, objects loaded in the loading space may be stacked such that the uppermost surface of the stacked objects is proximate to the upper portion (e.g., ceiling) of the loading space (e.g., stacked up to the ceiling of the loading space or substantially close to the ceiling with an air gap between the stacked objects and the ceiling). In the noted example, a movable body may be re-inserted into the loading space and/or re-positioned within the loading space after an area of the loading space has been completed, wherein an area of the loading space may be determined to be completed by the loading operation monitoring apparatus based at least in part on the height of the contents. Accordingly, an exemplary loading operation monitoring apparatus described herein may be configured to programmatically monitor loading operations and determine space utilization and/or detect loading conditions (with respect to space utilization) based at least in part on the imaging data captured by the imaging device during the loading operation. For example, the present disclosure may include processing the imaging data captured by the imaging device by executing one or more operations, such as machine learning operations and/or image processing operations, to programmatically determine space utilization and detect loading conditions associated with the loading space, such as unsatisfactory loading conditions (e.g., unused space/volume/area within the loading space) and satisfactory loading conditions (e.g., 100% space utilization, 98% space utilization, and/or the like).

In various embodiments, the movable body may be configured to facilitate movement of the imaging device along the length of the loading space. For example, in some embodiments, the imaging device may be mounted, suspended from, or otherwise secured to a movable body that is configured to substantially encompass the length of the loading space of a carrier when inserted into the loading space, and that is configured to be inserted within the loading space during a loading operation. The imaging device may be movable along the movable body and may be caused, by a controller, to capture imaging data at predetermined intervals based at least in part on the length of the loading space of the carrier. In some embodiments, a distance measuring device (such as a range sensor) may be utilized to measure the distance between the imaging device and a first location within the loading space, wherein the first location may comprise a reference point for the controller for controlling movement of the movable body and/or causing the imaging device to capture imaging data.

In some embodiments, the movable body may be embodied as an extendable movable body (e.g., an extendable beam), and the imaging device may be mounted on and/or otherwise secured to the extendable beam (e.g., proximate to an end of the extendable beam) such that the imaging device may be caused to move along a length of a loading space by extending (e.g., via operation of a motor) the extendable beam into the loading space, for example, from the rear of the carrier. As described above, in various embodiments, the extendable beam may be configured to be positioned within the loading space of a carrier during a loading operation and above relative to a height of the contents within the loading space. The extendable beam may be re-inserted and/or re-positioned within a loading space one or more times during a loading operation associated with the loading space.

In some embodiments, the movable body may be embodied as a beam having a carriage secured thereto (e.g., a carriage beam), and the imaging device may be mounted on and/or otherwise secured to the carriage, wherein the imaging device may be caused to move along a length of a loading space (e.g., via substantially horizontal movement of the carriage) when the carriage beam is positioned within the loading space. In various embodiments, the carriage beam may be configured to be positioned within the loading space of a carrier during a loading operation and above relative to a height of the contents of the loading space. The carriage beam may be re-inserted and/or re-positioned within a loading space one or more times during a loading operation associated with the loading space.

In some embodiments, the movable body may be embodied as a flying object (e.g., a drone, and/or the like) having an imaging device secured to the flying object (e.g., secured to a lower portion of the flying object, secured to a front portion of the flying object, or other suitable location with respect to the flying object), wherein the movable body is configured to be inserted within a loading space during a loading operation associated with the loading space in order to monitor the loading operation and to detect a loading condition defined by the space utilization of the loading space. The flying object may be re-inserted and/or re-positioned within a loading space one or more times during a loading operation associated with the loading space.

Accordingly, according to various embodiments of the present disclosure, an exemplary loading operation monitoring apparatus may be used for monitoring loading operations associated with various types of carriers, including carriers having an open top, as well as carriers having a closed top without interfering with the loading operations, and may be used to monitor objects of various sizes.

While various example embodiments of a movable body are described herein, it should be appreciated that a movable body according to various embodiments of the present disclosure may comprise any movable body that can be inserted and/or otherwise be caused to move within a loading space to facilitate movement of an imaging device secured to the movable body.

A controller may be configured to cause the imaging device to be inserted in a loading space of a carrier via operation of the movable body and may cause the imaging device to capture imaging data of the loading space and contents therein. The controller may comprise one or more processors configured to analyze and/or process the imaging data to determine a space utilization measure with respect to the loading space and a loading condition of the loading space. The controller may utilize the output of the distance measuring device (e.g., range sensor) to determine the length of the loading space (e.g., distance between the rear of the loading space and a front wall of the loading space and may determine a required number of images/frames (e.g., optimal number of images) to capture in order to generate a complete representation of the loading space and the contents therein. The controller may be configured to cause the imaging device to move stepwise (e.g., step distance) along a length of the loading space and cause the imaging device to capture imaging data at intervals based at least in part on the required number of images (e.g., optimal number of images) determined by the controller. The controller may be configured to periodically or continuously cause the imaging device to capture an optimal number of images that substantially encompasses the entire length of the loading space and analyze and/or process the imaging data periodically or continuously to determine the space utilization of the loading space and/or loading condition of the loading space (e.g., periodically). Additionally, and/or alternatively, the controller may be configured to cause the imaging device to capture an optimal number of images that substantially encompasses the entire length of the loading space based at least in part on receiving a signal and/or data indicative of loading operation (e.g., movement of a human operator in and out of the loading space). The controller may be configured to receive the noted signal and/or data from one or more sensors located proximate to the loading space, wherein the one or more sensors may be configured to determine a loading operation status based at least in part on movement of human operator(s) in and out of the loading space.

Further the controller (e.g., one or more processors thereof) may be configured to generate a representation (e.g., 3D representation) of the loading space of the carrier, and based at least in part on the loading space representation (e.g., 3D representation) determine a space utilization measure; determine a loading condition; determine floor space and/or volume remaining; monitor and guide placement of objects via feedback to the loaders (e.g., human operators), or track the rate of progress of the loading operation. Further, the controller may be configured to generate reporting data that may include one or more of space utilization measure; floor space and/or volume remaining; rate of progress of the loading operation; and loading condition. The controller may be configured to transmit the noted reporting data to one or more computing devices (e.g., a computing device associated with a supervisor, manager, and/or the like associated with the loading environment).

In various embodiments, an exemplary loading operation monitoring apparatus described herein may further comprise a loading condition indicator electronically connected to the controller. In various embodiments, upon a loading condition associated with the loading space being detected (e.g., determined) by the exemplary loading operation monitoring apparatus based at least in part on the imaging data captured by the imaging device, the controller described herein may be configured to cause one or more alert signals corresponding to the detected loading condition to be transmitted from the loading condition indicator of the exemplary loading operation monitoring apparatus. For example, one or more alert signals comprising an audio and/or visual signal corresponding to the detected loading condition may be transmitted from the loading condition indicator such that, upon transmission from the loading condition indicator, may embody a perceivable indication of the particular loading condition (e.g., a light, a sound, a message, and/or the like, or any combination thereof) detected by the loading operation monitoring apparatus and/or an instructional message corresponding to the detected loading condition.

Additionally, and/or alternatively, in various embodiments, upon a loading condition associated with the loading space being detected by the exemplary loading operation monitoring apparatus based at least in part on the imaging data captured by the imaging device, the controller described herein may be configured to cause rendering of a loading condition user interface on one or more computing devices. For example, one or more messages corresponding to the detected loading condition may be caused by the controller to be transmitted such that, upon transmission, may embody an alert and/or an instructional message corresponding to the detected loading condition. The one or more computing devices, for example, may be associated with a supervisor, manager, and/or the like of a loading environment.

As described herein, the present disclosure includes utilizing an imaging device that is movable along a length of a loading space to capture imaging data associated with the loading space and programmatically processing the captured imaging data to facilitate monitoring of a loading operation that may include detection of a loading condition (such as unused area, unused floor space, unused volume within a loading space) associated with the loading space. The present disclosure utilizing the movable optical detection technique described herein enables a loading operation monitoring apparatus that is defined by reduced product costs relative to apparatuses that may utilize a plurality of other sensors distributed about the loading space to monitor loading operations or determine a condition defined therein. Further, the present disclosure may be configured to substantially continuously and/or periodically monitor loading of carrier (e.g., a truck, container, lorry, tipper, trailer, and/or the like) associated with a loading environment such as a commercial loading dock, private loading dock, warehouse, and/or the like, and transmit corresponding alert signals in substantially real-time as an indication of a loading condition defined by the loading space of the carrier at a particular instance. Accordingly, as described herein, the present disclosure drastically reduces the opportunity for underutilization of loading space of carriers.

FIG. 1 schematically illustrates a side view of an exemplary apparatus for monitoring loading operation of a loading space associated with a carrier. In particular, FIG. 1 schematically illustrates a side view of an exemplary loading operation monitoring apparatus configured to monitor loading operations of a carrier, wherein loading conditions may be detected, such as, for example, loading conditions related to space utilization of the loading space of a carrier based at least in part on captured imaging data corresponding to the loading arrangement of the contents (e.g., objects) placed within the loading space. FIG. 1 depicts an exemplary loading operation monitoring apparatus in an operating configuration (e.g., during use). In various embodiments, for example, an exemplary loading operation monitoring apparatus 100 may be configured to monitor the loading of a loading space of an exemplary carrier 20, such as, for example, a container, a truck, a trailer, a tipper, and/or the like to detect a loading condition associated with a loading operation associated with the carrier. For example, a carrier 20, may be manually loaded with objects by one or more human operators within a loading environment (e.g., a loading dock, a warehouse, and/or the like) to facilitate transportation of the objects to a destination where the objects are unloaded. A loading operation may involve stacking objects to occupy a volume within the loading space. As described above, in various loading environments, objects loaded within a loading space may be stacked such that the uppermost surface of the stacked objects is proximate to the upper portion (e.g., ceiling) of the loading space. Furthermore, in various loading environments, a loading operation may be performed incrementally (e.g., starting from the front of the loading space), where an area of the loading space is completed before completing an adjacent area of the loading space.

An exemplary carrier 20 may comprise a loading space 21 configured to receive objects that may be embodied in various forms (e.g., boxes, pallets, and/or the like) and that may have various dimensions (e.g., various length and width). The loading space 21 of the carrier 20 may be defined by a front wall 21a, opposing side walls 21b, 21c, a rear wall 21d, a bottom wall 21e (e.g., platform, floor), and a top wall 21f (e.g., roof, ceiling). The rear wall 21d may be configured to be in an open configuration during a loading operation and may be used as an access point by a human operator to position objects within the loading space 21, wherein the objects are supported by the bottom wall 21e of the loading space 21, and wherein the objects may be loaded from the front of the loading space to the rear of the loading space.

In various embodiments, a loading operation monitoring apparatus may be configured to be inserted and/or positioned within a loading space of a carrier to monitor a loading operation, so as to, for example, monitor the utilization of the loading space and to detect a loading condition defined at least in part by the arrangement of objects placed within the loading space. For example, as illustrated in FIG. 1, an exemplary loading operation monitoring apparatus 100 may be positioned (at least a portion thereof), during a loading operation, within the loading space 21 and may be configured to determine space utilization and detect a loading condition within the loading space 21, wherein the loading condition may be defined at least in part by the arrangement of objects placed within the loading space (e.g., location of the objects relative to each other).

As a non-limiting example, the loading operation monitoring apparatus 100 may be configured to detect a satisfactory loading condition defined at least in part by the objects being arranged in a condition that maximizes utilization of the loading space 21, and unsatisfactory loading condition defined at least in part by the objects being arranged in a condition that fails to maximize utilization of the loading space 21. The loading operation monitoring apparatus 100 may be configured to periodically and/or continuously monitor a loading operation to detect a loading condition (e.g., satisfactory loading condition, unsatisfactory loading condition, and/or the like) during a loading operation. It should be understood, however, that satisfactory loading condition and unsatisfactory loading conditions are examples of loading conditions, and other embodiments, may comprise a variety of other loading conditions that may be detected.

In various embodiments, a loading operation monitoring apparatus 100 may comprise an imaging device 110 configured to capture imaging data of the content (e.g., objects) of a loading space 21, a movable body (embodied as an extendable beam 130) configured to support the imaging device 110 and to facilitate movement of the imaging device 110, a distance measuring device 140 configured to determine (or facilitate determining by a controller, such as controller 120) the distance between the imaging device 110 and the front wall 21*a* of the loading space 21, and a controller 120 in communication with the imaging device 110 and configured to determine space utilization measures and detect loading conditions based at least in part on imaging data received from the imaging device 110.

In various embodiments, the imaging device 110 may be configured to capture imaging data of the content within the loading space of a carrier. In various embodiments, the imaging device 110 may at least substantially continuously and/or periodically capture imaging data including a plurality of images and/or the like that may be at least periodically or substantially continuously processed and/or analyzed (e.g., by the controller 120) such that the exemplary loading operation monitoring apparatus 100 is configured to at least substantially continuously and/or periodically monitor a plurality of loading configurations embodying outputs that may be utilized to collectively determine and/or define a loading condition at a plurality of instances. For example, such an exemplary configuration may facilitate a robust configuration that functions to maximize the operational reliability (e.g., accuracy) of the loading operation monitoring apparatus 100 in detecting the loading condition at a particular instance.

The movable body (embodied as an extendable beam 130) may be movable in that it may be positioned temporarily within a loading space 21 (e.g., not permanently fixed within a loading space). For example, the extendable beam 130 may be configured be re-inserted (e.g., moved in and out) into the loading space 21 one or more times during a loading operation and/or re-positioned one or more times during a loading operation.

In the depicted embodiment of FIG. 1, the extendable beam 130 may be configured for substantially horizontal movement such that the extendable beam 130 may be extended substantially horizontal into the loading space 21 of the exemplary carrier 20. For example, as shown in FIG. 1, the extendable beam 130 may be configured such that when extended into the loading space 21, the extendable beam 130 is substantially horizontal relative to the bottom wall 21*e* of the loading space 21 (configured to support objects placed within the loading space 21). As a non-limiting example, in some embodiments, the extendable beam may comprise a substantially rigid monolithic bar (e.g., monolithic aluminum bar), with various cross-sections or tensional supports. As a non-limiting example, in various embodiments, the extendable beam 130 may be moved (e.g., extended) via a motorized mechanism. For example, the movable body may be embodied as a motorized extendable beam 130.

The extendable beam 130 may be configured to support the imaging device 110. Additionally, the extendable beam 130 may be configured to facilitate movement of the imaging device 110 along a length (e.g., substantially entire length) of the loading space 21, wherein the imaging device may capture one or more images of the loading space that collectively represent a map (e.g., a 3D map) of the contents within the loading space. As shown in FIG. 1, the imaging device 110 may be secured to a first end portion 132 of the extendable beam 130, wherein the imaging device 110 may be configured to move along a length of the loading space 21 via operation (e.g., movement) of the extendable beam 130. In various embodiments, the imaging device 110 may be secured to the extendable beam 130 at the first end portion 132 of the movable body 130 such that the imaging device 110 does not move relative to the movable body 130. In various embodiments, the horizontal movement of the extendable beam 130 above objects placed within a loading space may facilitate horizontal movement of the imaging device 110 above objects placed within the loading space 21, wherein the imaging device 110 may capture imaging data that encompasses the length (e.g., substantially entire length) of the loading space. In various embodiments, the imaging device 110 may be secured (e.g., mounted) to the first end portion 132 of the extendable beam 130 via a bracket (not shown) and/or other suitable coupling/mounting mechanisms.

In various embodiments, the extendable beam 130 may be configured be re-inserted into the loading space 21 one or more times during a loading operation and/or re-positioned one or more times during a loading operation based at least in part on completion of loading in an area of the loading space. For example, the extendable beam 130 may be extended into the loading space periodically or continuously at varying lengths, wherein the imaging device may be caused (e.g., by the controller 120) to capture imaging data of the contents of the loading space and may be retracted following extension of the imaging device along a length of the loading space. For example, the extendable beam 130 may be extended a first length into the loading space 21 and may subsequently be extended (e.g., after being retracted) a second length into the loading space 21, wherein the second length may be less than the first length. In various embodiments, the first length and the second length may be determined based at least in part on the height of the contents of the loading space at a particular instance. For example, as noted above, in various loading environments, a loading operation may be performed incrementally (e.g., starting from the front of the loading space), where an area of the loading space is completed before completing an adjacent area of the loading space, and wherein the loading space may be stacked such that the uppermost surface of the stacked objects is proximate to the upper portion (e.g., ceiling) of the loading space. In various embodiments, the controller 120 may be configured to: (i) determine the height of the contents of the loading space (e.g., contents of a particular area of the loading space) at least periodically during the loading operation (ii) and in response to determining that the height of the contents of the loading space satisfies (e.g., exceeds) a content height threshold: (a) determine that loading of the particular area of the loading space has been completed, and (b) cause the extendable beam when re-inserted into the loading space to extend a second length that is less than the immediately preceding first length. A content height threshold may describe a maximum loading height for a given loading space that is configured to be used by a controller (such as controller 120) to determine how far within a loading space a movable body should be inserted within the loading space.

In various embodiments, the imaging device may be secured to the extendable beam such that the field of view of the imaging device is in a substantially vertical direction (e.g., facing down/pointing down towards the bottom wall of the loading space 21), wherein the imaging device 110 may be configured to capture one or more imaging data of the loading space that collectively represent a map of the loading space (and thus contents within the loading space) as the imaging device moves along a length of the loading space. For example, in various embodiments, the field of view of the imaging device may be orientated substantially perpendicular relative to the bottom wall 21e of the loading space, such that the field of view of the imaging device is facing down.

In some embodiments, the imaging device may be secured to the extendable beam such that the field of view of the imaging device is in a substantially horizontal direction (e.g., facing forward/pointing forward towards the front wall of the loading space 21), wherein the imaging device 110 may capture one or more imaging data of the loading space that collectively represent a map of the loading space (and thus contents within the loading space) as the imaging device moves along a length of the loading space. For example, in various embodiments, the field of view of the imaging device may be orientated substantially parallel relative to the bottom wall 21e of the loading space.

In various embodiments, the imaging device may be caused by the controller 120 to capture imaging data at intervals, wherein the imaging data encompasses the length of the loading space, and wherein consecutive imaging data overlap. As shown in FIG. 1, in various embodiments, the field of view of the imaging device may be configured to encompass the width (e.g., substantially entire width) of the loading space, wherein the imaging device may be configured to move from a first location within the loading space to a second location within the loading space substantially horizontal relative to the bottom wall 21e (e.g., floor of loading space). In the depicted embodiment of FIG. 1, the imaging device 110 is orientated such that the field of view 160 of the imaging device is facing downwardly. As noted above, in various other embodiments, the imaging device 110 may be orientated such that the field of view of the imaging device is facing forward towards the front wall of the loading space, wherein the back edge of the field of view may be substantially vertical.

In various embodiments, the distance measuring device 140 may comprise a range sensor (e.g., laser range sensor), and may be secured to the first end portion 132 (or other suitable portion) of the extendable beam, wherein the distance measuring device may be configured to measure the distance between the imaging device 110 and the front wall 21a (or facilitate determining by a controller, such as controller 120) the distance between the imaging device 110 and the front wall 21a), and wherein the controller may cause the imaging device to capture imaging data at intervals that are determined based at least on the measured/determined distance between the imaging device 110 and the front wall 21a. It should be understood, however, that in some embodiments, the loading operation monitoring apparatus 100 may not include a range sensor and may instead include one or more other devices and/or mechanisms configured to measure the distance between the imaging device and the front wall 21a.

As described above, the extendable beam 130 may be movable in that it may be positioned temporarily within a loading space 21 (e.g., not permanently fixed within a loading space). For example, in various embodiments, the extendable beam 130 may be configured to be moved between different locations (e.g., between different dock stations), wherein the loading operation monitoring apparatus 100 may be used at different locations. As a non-limiting example, in some embodiments, the extendable beam 130 may be secured to a mobile object (e.g., a vehicle), wherein the extendable beam 130 (including other components of the loading operation monitoring apparatus coupled/secured to the extendable beam 130) may be transported from one location to another (e.g., from one dock door to another dock door) and may be utilized at the noted different locations. For example, the extendable beam 130 may be secured to a substantially vertical support structure that is mounted on mobile object (e.g., autonomous vehicle) and/or one or more wheels to facilitate movement of the extendable beam 130 between different locations.

Figure 2A:
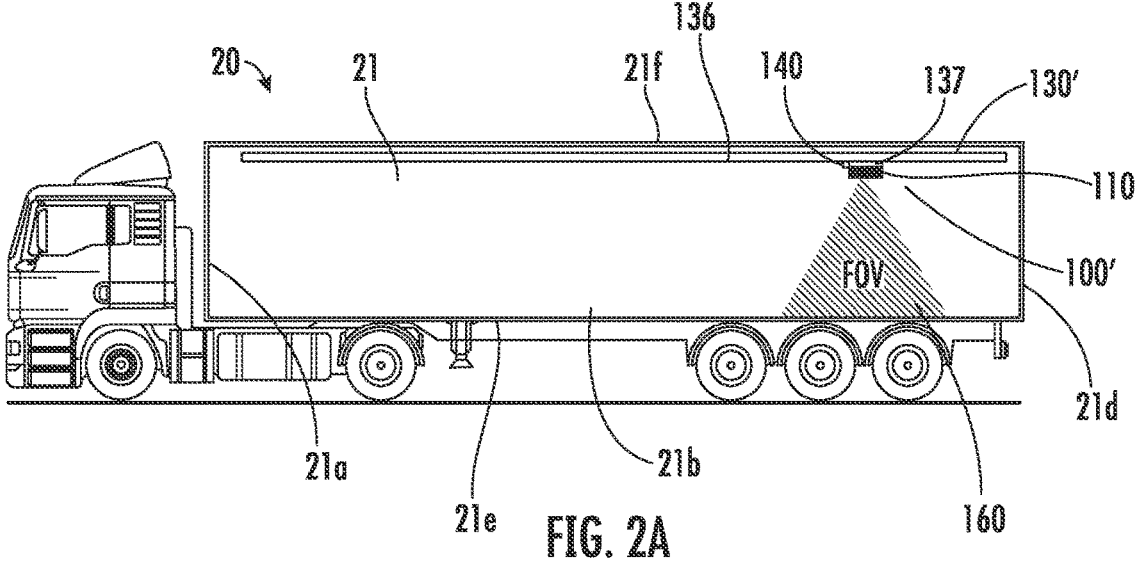
FIG. 2A illustrates a side view of an exemplary loading operation monitoring apparatus in an operating configuration according to another example embodiment described herein.
Figure 2B:
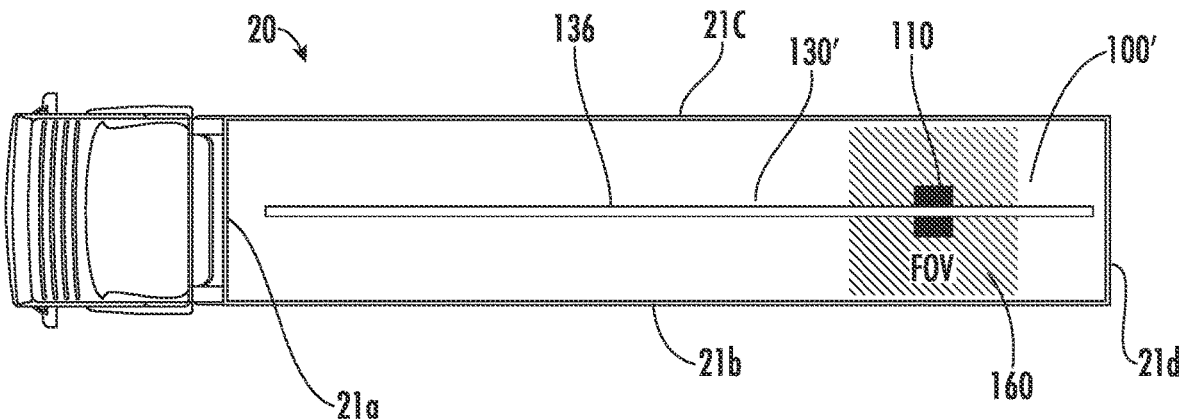
FIG. 2B illustrates a top view of the exemplary loading operation monitoring apparatus of FIG. 2A according to an example embodiment described herein.

FIG. 2A schematically illustrates a side view of an exemplary loading operation monitoring apparatus 100' configured to monitor loading operations of a carrier, wherein space utilization and loading conditions may be detected (e.g., determined), such as, for example, loading conditions related to space utilization of the loading space of the carrier based at least in part on captured imaging data corresponding to the loading arrangement of the contents (e.g., objects) placed within the loading space. The exemplary loading operation monitoring apparatus 100' can be an alternate embodiment of the exemplary loading operation monitoring apparatus 100. FIG. 2B schematically illustrates a top view of the exemplary loading operation monitoring apparatus 100'

FIGS. 2A and 2B depict the exemplary loading operation monitoring apparatus 100' in an operating configuration (e.g., during use) in that that at least a portion of the loading operation monitoring apparatus 100' is positioned within a loading space of an exemplary carrier. An exemplary loading operation monitoring apparatus 100' may be configured to monitor the loading of a loading space of an exemplary carrier 20, such as, for example, a container, a truck, a trailer, a tipper, and/or the like to determine space utilization and to detect a loading condition associated with a loading operation associated with the carrier. For example, a carrier 20, may be manually loaded with objects by one or more human operators within a loading environment (e.g., a loading dock, a warehouse, and/or the like) to facilitate transportation of the objects to a destination where the objects are unloaded.

An exemplary carrier 20 may comprise a loading space 21 configured to receive objects that may be embodied in various forms (e.g., boxes, pallets, and/or the like) and that may have various dimensions (e.g., various length and width). The loading space 21 of the carrier 20 may be defined by a front wall 21a, opposing side walls 21b, 21c, a rear wall 21d, a bottom wall 21e (e.g., platform), and a top wall 21f (e.g., roof). The rear wall 21d may be configured to be in an open configuration during a loading operation and may be used as access point by a human operator to position objects within the loading space 21, such that they are supported by the bottom wall 21e of the loading space 21.

In various embodiments, a loading operation monitoring apparatus may be configured to be inserted/positioned within a loading space of a carrier to monitor a loading operation, so as to, for example, determine space utilization and detect a loading condition defined at least in part by the arrangement of objects placed within the loading space. For example, as illustrated in FIGS. 2A and 2B, an exemplary loading operation monitoring apparatus 100' may be positioned, during a loading operation, within the loading space 21 and may be configured to detect a loading condition within the loading space 21, wherein the loading condition may be defined at least in part by the arrangement of objects placed within the loading space (e.g., location of the objects relative to each other)

As a non-limiting example, the loading operation monitoring apparatus 100' may be configured to detect a satisfactory loading condition defined at least in part by the objects being arranged in a condition that maximizes utilization of the loading space 21 and unsatisfactory loading condition defined at least in part by the objects being arranged in a condition that fails to maximize utilization of the loading space 21. The loading operation monitoring apparatus 100' may be configured to periodically and/or continuously detect a loading condition (e.g., satisfactory loading condition and unsatisfactory loading condition) during a load a loading operation. It should be understood, however, that satisfactory loading condition and unsatisfactory loading conditions are examples loading conditions, and other embodiments, may comprise different loading conditions that may be detected.

In various embodiments, a loading operation monitoring apparatus 100' may comprise an imaging device 110 configured to capture imaging data of the contents (e.g., objects) of the loading space, a movable body (embodied as a carriage beam 130') configured to support the imaging device 110 and facilitate movement of the imaging device 110, a distance measuring device 140 configured to determine (or facilitate determining by a controller, such as controller 120) the distance between the imaging device 110 and the front wall 21a of the loading space 21, and a controller 120 in communication with the imaging device 110 and configured to detect a loading condition based at least in part on imaging data received from the imaging device 110.

In various embodiments, the imaging device 110 may be configured to capture imaging data that represent a map (e.g., a 3D map) of the content within the loading space of a carrier. In various embodiments, the imaging device 110 may at least substantially continuously, and/or periodically capture imaging data including a plurality of images and/or the like that may be at least periodically or substantially continuously processed and/or analyzed (e.g., by the controller 120) such that the exemplary loading operation monitoring apparatus 100' is configured to at least substantially continuously or periodically monitor a plurality of loading configurations embodying outputs that may be utilized to collectively determine and/or define a loading condition at a plurality of instances. For example, such an exemplary configuration may facilitate a robust configuration that functions to maximize the operational reliability (e.g., accuracy) of the loading operation monitoring apparatus 100' in detecting the loading condition at a particular instance.

The movable body (embodied as a carriage beam 130') may be movable in that the carriage beam 130' may be temporarily positioned within a loading space 21 during a loading operation. In the depicted embodiment of FIGS. 2A and 2B, the carriage beam 130' may comprise a carriage 137 secured to a beam 136, wherein the carriage 137 may be configured for substantially horizontal movement along the beam 136. The carriage beam 130' may additionally include a drive mechanism (not shown) configured to facilitate movement of the carriage 137 along the beam 136. As a non-limiting example, the drive mechanism may comprise one or more drive rollers (e.g., wheels) coupled to the carriage 137 and configured to enable movement of the carriage 137 along the beam 136. The drive rollers (not shown), for example, may be coupled to a drive motor configured to facilitate movement of the drive rollers. As a non-limiting example, the carriage beam 130' may comprise one or more guide rails (e.g., a single guide rail, a pair of guide rails) that are configured to guide the carriage along the beam. For example, the carriage may comprise one or more wheels configured to be coupled to the one or more guide rails to allow/enable horizontal movement of the carriage 137 along the beam 136. As another non-limiting example, in some embodiments, the beam 136 may comprise a "C" channel aluminum beam. In various embodiments, the carriage 137 may be movable along the entire length (e.g., substantially entire length) of the beam 136.

In various embodiments, the carriage beam 130' may be configured be re-inserted into the loading space 21 one or more times during a loading operation and/or re-positioned one or more times during a loading operation based at least in part on completion of loading in an area of the loading space. For example, the carriage beam 130' may be inserted within the loading space periodically or continuously at varying lengths, wherein the imaging device may be caused (e.g., by the controller 120) to capture imaging data of the contents of the loading space along a length of the loading space. For example, the carriage beam 130' may be inserted a first length into the loading space 21 and may subsequently be re-inserted (e.g., after being removed from the loading space) a second length into the loading space 21, wherein the second length may be less than the first length. In various embodiments, the first length and the second length may be determined based at least in part on the height of the contents of the loading space at a particular instance. For example, as noted above, in various loading environments, a loading operation may be performed incrementally (e.g., starting from the front of the loading space), where an area of the loading space may be completed before completing an adjacent area of the loading space, and wherein the loading space may be stacked such that the uppermost surface of the stacked objects is proximate to the upper portion (e.g., ceiling) of the loading space. In various embodiments, the controller 120 may be configured to: (i) determine the height of the contents of the loading space (e.g., contents of a particular area of the loading space) at least periodically during the loading operation, and (ii) in response to determining that the height of the contents of the loading space satisfies (e.g., exceeds) a content height threshold: (a) determine that loading of the particular area of the loading space has been completed, and (b) cause the carriage beam 130' when re-inserted into the loading space to encompass a second length that is less than the immediately preceding first length. As described above, a content height threshold may describe a maximum loading height for a given loading space that is configured to be used by a controller (such as controller 120) to determine how far within a loading space a movable body (such as carriage beam 130') should be inserted within the loading space.

In various embodiments, the imaging device 110 may be secured (e.g., fixedly secured) to the carriage to allow movement of the imaging device 110 along a length (e.g., substantially entire length) of the beam 136. In various embodiments, the imaging device 110 may be secured to a bottom portion of the carriage 137. The imaging device 110, for example, may be secured to the carriage 137 such that it is suspended from the carriage. In various embodiments, the imaging device may be secured to the carriage 137 such that the field of view of the imaging device is in a substantially vertical direction (e.g., facing down/pointing down towards the bottom wall of the loading space 21), wherein the imaging device 110 may be configured to capture one or more imaging data of the loading space that collectively represent a map of the contents within the loading space as the imaging device moves along a length of the loading space. For example, in various embodiments, the field of view 160 of the imaging device may be orientated substantially perpendicular relative to a bottom wall 21e of the loading space, such that the field of view of the imaging device is facing down.

In various embodiments, the imaging device 110 may be secured to the carriage 137 such that the field of view 160 of imaging device 110 is in a substantially horizontal direction (e.g., facing forward/pointing forward towards the front wall of the loading space 21), wherein the imaging device 110 may capture one or more imaging data of the loading space that collectively represent a map of the loading space (and thus contents within the loading space) as the imaging device moves along a length of the loading space. For example, in various embodiments, the field of view 160 of the imaging device may be orientated substantially parallel relative to a bottom wall of the loading space. It should be understood, however, that the carriage 137 can be embodied as any movable structure configured to support the imaging device 110 and configured to move along a beam. As a non-limiting example, the carriage 137 may be embodied as a shuttle, a trolley, a slider, and/or the like.

In various embodiments, the imaging device 110 may be caused by the controller 120 to capture imaging data at intervals, wherein the imaging data encompasses the length (e.g., substantially entire length) of the loading space, and wherein consecutive imaging data may overlap. In various embodiments, the field of view 160 of the imaging device 110 may be configured to encompass the width (e.g., substantially entire width) of the loading space, wherein the imaging device 110 may be configured to move from a first location within the loading space to a second location within the loading space substantially horizontal relative to the bottom wall (e.g., floor of loading space). In the depicted embodiment of FIG. 2B, the imaging device is orientated such that the field of view 160 of the imaging device is facing downwardly. As noted above, in various other embodiments, the imaging device 110 may be orientated such that the field of view 160 of the imaging device is facing forward towards the front wall 21a of the loading space 21, wherein the back edge of the field of view may be substantially vertical.

In various embodiments, the horizontal movement of the carriage 137 above objects placed within a loading space may facilitate horizontal movement of the imaging device 110 above objects placed within the loading space 21 such that the imaging device 110 may capture imaging data that encompasses the length (e.g., substantially entire length) of the loading space 21. The carriage beam 130' may be configured to be positioned within the loading space 21 during a loading operation. The carriage beam 130' may be configured such that when inserted into the loading space 21, the carriage beam 130' is substantially horizontal relative to the bottom wall 21e of the loading space 21 (configured to support objects placed within the loading space 21).

In various embodiments, the carriage beam 130' may be configured to be positioned within the loading space 21 of a carrier during a loading operation of the carrier at a position that is above relative to the maximum loading height for the loading space, such that the carriage beam 130' and the imaging device 110 do not come in contact with the objects placed within the loading space 21 (e.g., even when the loading space is at 100% utilization). The maximum loading height for a loading space 21 may define the maximum height objects placed within the loading space may be stacked and/or the maximum height of objects that may be placed within the loading space 21.

In various embodiments, the distance measuring device 140 may comprise a range sensor, and may be secured to the carriage 137 of the carriage beam and may be configured to measure (or facilitate determining by a controller, such as controller 120) the distance between the imaging device 110 and the front wall 21a, wherein the controller may cause the imaging device to capture image data at locations that are determined based at least on the measured/determined distance between the imaging device 110 and the front wall 21a. Additionally, and/or alternatively a distance measuring device 140 (not shown) may be secured to the beam 136, and may be configured for determining the distance between a front end of the beam 136 and the front wall 21a of the loading space 21. It should be understood, however, that in some embodiments, the loading operation monitoring apparatus 100 may not include a range sensor and may instead include one or more other devices and/or mechanisms configured to measure the distance between the camera and the front wall 21a.

Figure 3:
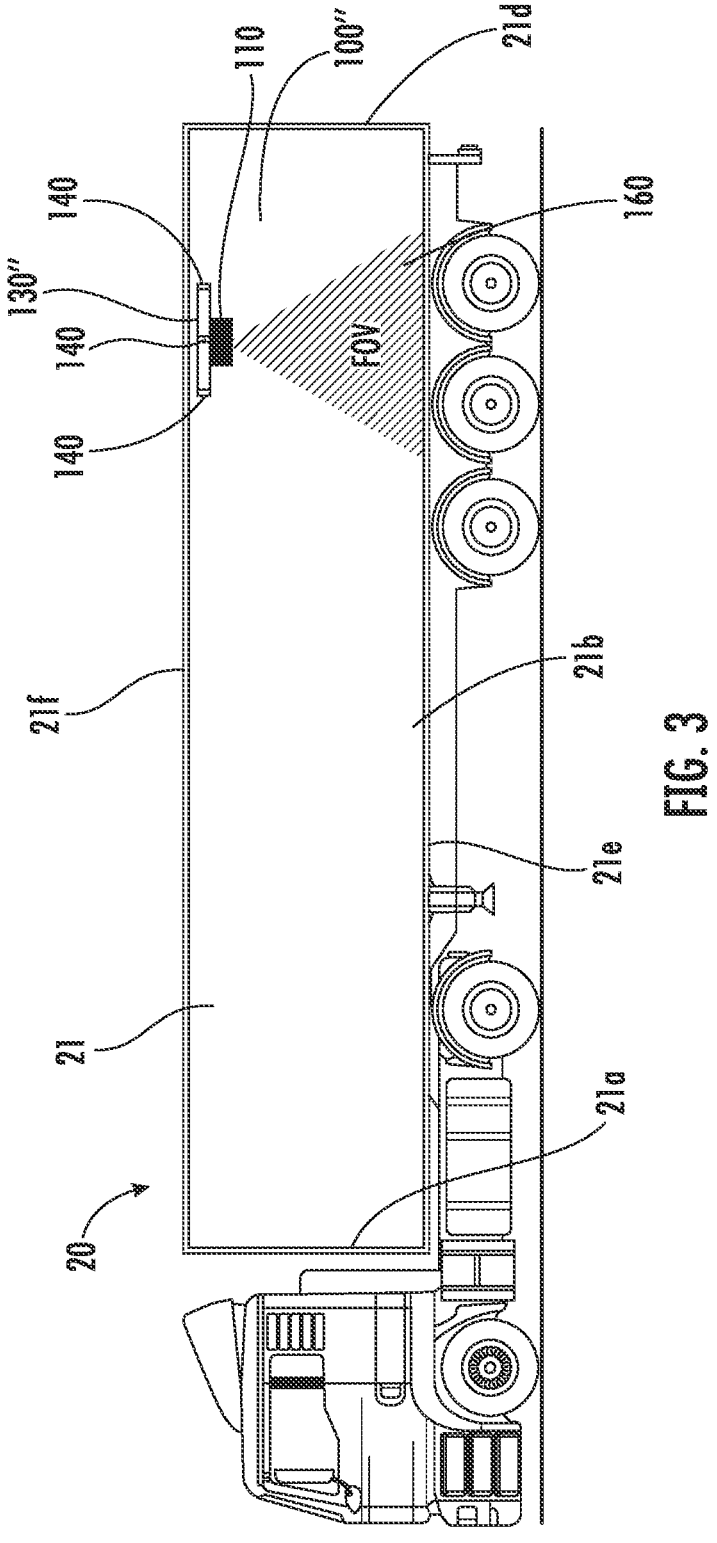
FIG. 3 illustrates a side view of an exemplary loading operation monitoring apparatus in an operating configuration according to another example embodiment described herein.

FIG. 3 schematically illustrates a side view of an exemplary loading operation monitoring apparatus 100" configured to detect loading condition, such as, for example, space utilization of the loading space of a carrier based at least in part on captured imaging data corresponding to the loading arrangement of the contents (e.g., objects) placed within the loading space. The exemplary loading operation monitoring apparatus 100" can be an alternate embodiment of the exemplary loading operation monitoring apparatus 100.

FIG. 3 depicts the exemplary loading operation monitoring apparatus 100" in an operating configuration in that it is within a loading space of an exemplary carrier. An exemplary loading operation monitoring apparatus 100" may be configured to monitor the loading of a loading space of an exemplary carrier 20, such as, for example, a container, a truck, a trailer, a tipper, and/or the like to determine space utilization and to detect a loading condition associated with a loading operation associated with the carrier. For example, a carrier 20, may be manually loaded with objects by one or more human operators within a loading environment (e.g., a loading dock, a warehouse, and/or the like) to facilitate transportation of the objects to a destination where the objects are unloaded.

An exemplary carrier 20 may comprise a loading space 21 configured to receive objects that may be embodied in various forms (e.g., boxes, pallets, and/or the like) and that may have various dimensions (e.g., various length and width). The loading space 21 of the carrier 20 may be defined by a front wall 21a, opposing side walls 21b, 21c, a rear wall 21d, a bottom wall 21e (e.g., platform), and a top wall 21f (e.g., roof). The rear wall 21d may be configured to be in an open configuration during a loading operation and may be used as access point by a human operator to position objects within the loading space 21, such that they are supported by the bottom wall 21e of the loading space 21.

In various embodiments, a loading operation monitoring apparatus 100" may be configured to be positioned within a loading space of a carrier to monitor a loading operation, so as to, for example, determine space utilization and to detect a loading condition defined at least in part by the arrangement of objects placed within the loading space. For example, as illustrated in FIG. 3, an exemplary loading operation monitoring apparatus 100" may be positioned, during a loading operation, within the loading space 21, and may be configured to detect loading conditions within the loading space 21, wherein the loading conditions may be defined at least in part by the arrangement of objects placed within the loading space (e.g., location of the objects relative to each other)

As a non-limiting example, the loading operation monitoring apparatus 100" may be configured to detect a satisfactory loading condition defined at least in part by the objects being arranged in a condition that maximizes utilization of the loading space 21, and unsatisfactory loading condition defined at least in part by the objects being arranged in a condition that fails to maximize utilization of the loading space 21. The loading operation monitoring apparatus 100" may be configured to periodically detect a loading condition (e.g., satisfactory loading condition and unsatisfactory loading condition) during a load a loading operation. It should be understood, however, that satisfactory loading condition and unsatisfactory loading conditions are examples loading conditions, and other embodiments, may comprise different loading conditions, as well comprise more or less loading conditions that may be detected.

In various embodiments, a loading operation monitoring apparatus 100" may comprise an imaging device 110 configured to capture imaging data of the content (e.g., objects) of the loading space, a movable body (embodied as a flying object 130") configured to support the imaging device 110 and facilitate movement of the imaging device 110 within a loading space, a distance measuring device 140 configured determine distance between the imaging device 110 and the front wall 21a of the loading space 21, and a controller 120 in communication with the imaging device 110 and configured to detect a loading condition based at least in part on imaging data received from the imaging device 110.

In various embodiments, the imaging device 110 may be configured to capture imaging data that represent a map of the contents within the loading space of a carrier. In various embodiments, the imaging device 110 may be caused to substantially continuously and/or periodically capture imaging data including a plurality of images and/or the like that may be at least periodically or substantially continuously processed and/or analyzed (e.g., by the controller 120), wherein the exemplary loading operation monitoring apparatus 100' may be configured to at least substantially continuously monitor a plurality of loading configurations embodying outputs that may be utilized to collectively determine and/or define loading conditions at a plurality of instances. For example, such an exemplary configuration may facilitate a robust configuration that functions to maximize the operational reliability (e.g., accuracy) of the loading operation monitoring apparatus 100" in detecting the loading condition at a particular instance.

The flying object 130", for example, may comprise a drone or any flying object that can be temporarily positioned within a loading space of a carrier and can support an imaging device. In various embodiments, the imaging device 110 may be secured (e.g., fixedly secured) to the flying object 130" such that the field of view 160 of the imaging device is in a substantially vertical orientation (e.g., looking down towards the bottom wall of the loading space 21) when the flying object is within the loading space 21, wherein the imaging device 110 may be caused (e.g., by controller 120) to capture one or more imaging data of the loading space that collectively represent a map (e.g., 3D map) of the contents within the loading space. A controller 120 may cause the flying object 130" to be positioned within the loading space for a period of time to capture imaging data and may cause the flying object 130" to be positioned outside of the loading space upon capturing the imaging data. For example, the controller may cause the flying object 130" to move in and out of the loading space (e.g., re-inserted) periodically and/or continuously.

For example, in various embodiments, the flying object 130" may be configured to be re-inserted into the loading space 21 one or more times during a loading operation and/or re-positioned one or more times during a loading operation based at least in part on completion of loading in an area of the loading space. For example, the flying object 130" may be inserted within the loading space periodically or continuously, wherein the imaging device is caused (e.g., by the controller 120) to capture imaging data of the contents of the loading space along a length of the loading space. In various embodiments, the carriage beam 130' may be caused to move a first length into the loading space 21 and may subsequently be caused to move (e.g., after being removed from the loading space) a second length into the loading space 21, wherein the second length may be less than the first length. In various embodiments, the first length and the second length may be determined based at least in part on the height of the contents of the loading space at a particular instance. For example, as noted above, in various loading environments, a loading operation may be performed incrementally (e.g., starting from the front of the loading space), where an area of the loading space may be completed before completing an adjacent area of the loading space, and wherein the loading space may be stacked such that the uppermost surface of the stacked objects is proximate to the upper portion (e.g., ceiling) of the loading space. In various embodiments, the controller 120 may be configured to determine: (i) the height of the contents of the loading space (e.g., contents of a particular area of the loading space) at least periodically during the loading operation, and (ii) in response to determining that the height of the contents of the loading space satisfies (e.g., exceeds) a content height threshold: (a) determine that loading of the particular area of the loading space has been completed, and (b) cause the flying object 130" when re-inserted into the loading space to move a second length that is less than the immediately preceding first length. As described above, a content height threshold may describe a maximum loading height of the loading space.

Further the controller 120 may be configured to cause the flying object 130" to be positioned in a charging station when not within a loading space. In various embodiments, the flying object 130" may be caused by the controller to move between different locations within a loading environment (e.g., between dock doors) to capture images of the contents of multiple loading spaces, thus significantly reducing equipment costs.

In various embodiments, the distance measuring device 140 may comprise a range sensor. The distance measuring device 140 may be secured to a front end of the flying object, and may be configured to measure the distance between the imaging device 110 and the front wall 21a of the loading space 21 (or otherwise facilitate determining the distance between the imaging device 110 and the front wall 21a of the loading space 21), wherein the controller may cause the imaging device 110 to capture imaging data at locations that are determined based at least on the measured/determined distance between the imaging device 110 and the front wall 21a. It should be understood, however, that in some embodiments, the loading operation monitoring apparatus 100" may not include a range sensor and may instead include one or more other devices and/or mechanisms configured to measure the distance between the camera and the front wall 21a.

In various embodiments, the loading operation monitoring apparatus 100" may comprise a plurality of distance measuring device 140 (e.g., embodied as range sensors) secured to the flying object 130" at various locations thereof, wherein the plurality of distance measuring devices 140 may be configured to measure, at an instance in time, the distance between the flying object 130" and various portions within the loading space 21. The plurality of distance measuring devices 140, for example, may be secured to the flying object 130" to facilitate measuring of one or more of: (i) the distance between the flying object 130" and the side walls 21b, 21c of the loading space 21; (ii) the distance between the flying object and the top wall 21f (e.g., roof, ceiling) of the loading space; (iii) the distance between the flying object 130" and the bottom wall 21e (e.g., floor) of the loading space 21, (iv) the distance between the flying object 130" and a rear portion of the loading space 21 or (v) the distance between the flying object 130" and the contents (e.g., objects) within the loading space 21. For example, one or more distance measuring devices 140 may be secured to a first location of the flying object 130" that enables measurement of the distance between the flying object and a side wall of the loading space. As another example, one or more second distance measuring devices 140 may be secured to a second location of the flying object 130" that enables measurement of the distance between the flying object 130" and the upper portion of the loading space 21. As yet another example, one or more third distance measuring devices 140 may be secured to a third location of the flying object 130" that enables measurement of the distance between the flying object 130" and the front wall of the loading space. As a further example, one or more fourth distance measuring devices may be secured to a fourth location of the flying object that enables measurement of the distance between the flying object 130" and the content and/or bottom wall of the loading space. In various embodiments, the controller 120 may utilize output (e.g., measured distance(s)) of the plurality of distance measuring devices 140 to facilitate movement of the flying object 130" within the loading space 21. For example, the controller 120 may utilize output of the plurality of distance measuring devices 140 to facilitate safe navigation/movement of the flying object 130" within the loading space 21.

In various embodiments, the field of the view 160 of the imaging device 110 may be configured to encompass the width (e.g., substantially entire width) of the loading space. In various embodiments, the field of view 160 of the imaging device 110 may be configured to encompass a width of the loading space, wherein the imaging device may be configured to move from a first location within the loading space to a second location within the loading space. In various embodiments, as shown in FIG. 3, the imaging device may be orientated such that the field of view 160 of the imaging device is pointing downwardly. In various other embodiments, the imaging device 110 may be orientated such that the field of view of the imaging device is pointing towards the front wall of the loading space, wherein the back edge of the field of view may be substantially vertical.

As illustrated in FIGS. 1-3, an exemplary loading operation monitoring apparatus 100, 100', 100''' may comprise an imaging device 110 that is secured to a movable body (e.g., 130, 130', 130") configured to be positioned within the loading space at least an instance (e.g., temporarily) during the loading operation, wherein the imaging device 110 may have a direct line of sight to the loading space 21 defined by a carrier, such as, for example, along a top portion (e.g., a ceiling in the case of closed carrier) of the carrier 20. In various embodiments, the imaging device 110 may be secured to the movable body wherein the field of view 160 of the imaging device intersects objects located below relative to the imaging device. In various embodiments, the field of the view of the imaging device may encompass a width of the loading space. In various embodiments, the imaging device may be orientated such that the field of view of the imaging device is pointing downwardly. In various other embodiments, the imaging device may be orientated such that the field of view of the imaging device is pointing towards the front wall of the loading space, wherein the back edge of the field of view may be substantially vertical.

In various embodiments, the imaging device 110 may comprise one or more sensors configured to scan the content of a loading space to generate imaging data that collectively represent a map of the loading space. In various embodiments, the imaging device 110 may comprise a 3D imaging device such as, but not limited to, a 3D camera, a 2D TOF camera, an opto-mechanical a LIDAR device (e.g., solid-state LIDAR device), a millimeter wave radar device, a structured light-based 3D camera (e.g., Auto Cube), a stereo camera system, or any suitable 3D mapping device that may be operably positioned within a loading space to capture imaging data. In various embodiments, a 3D imaging device is the preferred imaging device. In various embodiments, the preferred imaging device is a 2D TOF camera. However, it should be understood that in some embodiments, the imaging device 110 can be a different type of image device and/or the imaging data can be a different type of imaging data.

In various embodiments, the imaging device 110 may comprise a 3D imaging device configured to capture imaging data comprising images. In some embodiments, the 3D imaging device may be configured to additionally capture video, and/or the like. In various embodiments, the 3D imaging device may have a resolution that is selected such that the 3D imaging device may distinctly capture images of objects with varying dimensions. For example, the 3D imaging device may have a resolution that is selected (e.g., based at least in part on the application), wherein the noted resolution of the 3D imaging device enables the smallest object captured in the field of view of the 3D imaging device to be distinguishable. In various embodiments, the 3D imaging device comprises an optical lens configured to define a field of view of the imaging device 110, an imaging device processing unit, various internal circuitries configured to facilitate power management and connectivity and/or networked communication of the imaging device. In various embodiments, as a non-limiting example, the optical lens of the imaging device may be configured such that the field of view of the imaging device may be at least approximately between 45 degrees and 180 degrees. Further, in various embodiments, the imaging device 110 may include a protective housing, such as, for example, a plastic dome configured to provide coverage over the other imaging device components for protection thereof. In various embodiments, the imaging device processing unit of the imaging device 110 may comprise a neural accelerator. In various embodiments, the imaging device processing unit of the imaging device 110 may comprise one or more hardware components and/or circuitries that are distinct from the controller 120 of an exemplary loading operation monitoring apparatus 100. Alternatively, or additionally, in various embodiments, one or more hardware components, circuitries, and/or functionalities of the imaging device processing unit of the imaging device 110 may be defined by the controller 120, as described herein, such that the imaging device processing unit of the imaging device 110 may be defined as part of the controller 120. In various embodiments, the imaging device 110 may comprise one or more EDGE artificial intelligence (AI) components that may comprise distinct hardware and/or circuitries in communication with the controller 120, or, alternatively, may comprise various hardware and/or circuitries that define part of the controller 120. As non-limiting examples provided for illustrative purposes, in various embodiments, the one or more EDGE AI component may comprise one or more of a k210 accelerator on a MAIX1 module, a V831 SoC on a MAIX2 module, a MAX78000 SoC, and/or the like, and may be configured to utilize a OpenCV AI Kit Lite as a hardware platform.

In various embodiments, the imaging device 110 may have a designated field of view for capturing, permanently and/or temporarily, one or more images of a loading space 21 defined by a carrier. For example, in various embodiments, the imaging device 110 may be configured such that at least a portion of the loading space 21 that is configured for receiving objects is within the designated field of view during movement of the imaging device from one location within the loading space to another location within the loading space.

In various embodiments, the 3D map generated by the imaging device may comprise depth information that are analyzed by the controller to generate a space utilization measure and/or a loading condition detection. For example, the imaging device 110 may comprise a 3D camera configured to capture 3D point cloud images, wherein the 3D point cloud images may comprise point cloud data associated with the objects within the loading space, wherein the point cloud data may comprise information, such as proximity of an object within the loading space with respect to another object, depth of an object relative to the camera, and/or the like.

Figure 4:
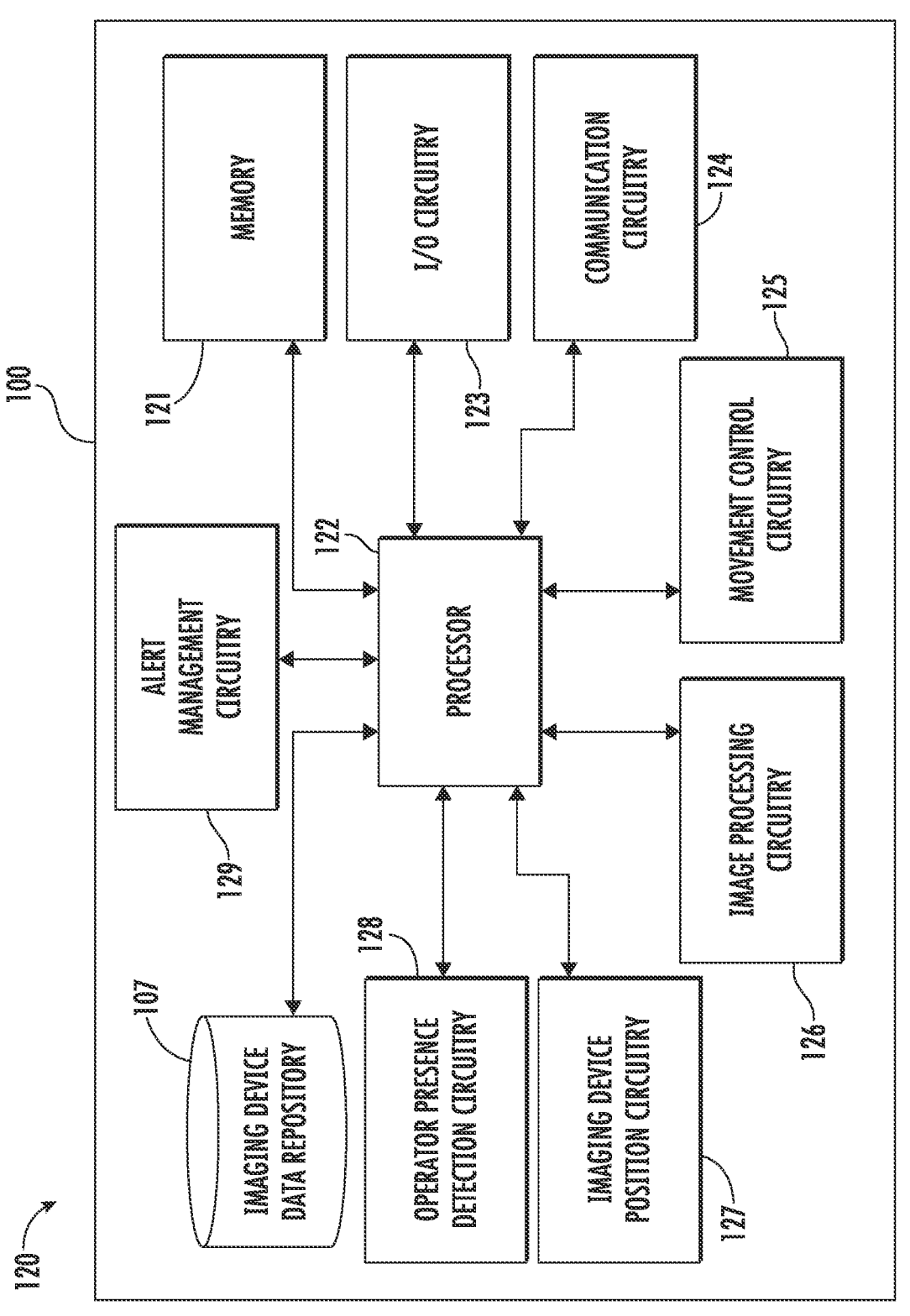
FIG. 4 illustrates a schematic view of an exemplary apparatus in accordance with various embodiments of the present disclosure.

As illustrated in FIG. 4, an exemplary loading operation monitoring apparatus, such as the embodiments 100, 100', 100" depicted in FIGS. 1-3 respectively, may comprise a controller 120 comprising a memory 121, a processor 122, input/output circuitry 123, communication circuitry 124, an imaging device data repository 107, movement control circuitry 125, image processing circuitry 126, imaging device position circuitry 127, operator presence detection circuitry 128, and alert management circuitry 129. The controller 120 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 120 may provide or supplement the functionality of particular circuitry. For example, the processor 122 may provide processing functionality, the memory 121 may provide storage functionality, the communication circuitry 124 may provide network interface functionality, and the like.

In some embodiments, the processor 122 (and/or coprocessor or any other processing circuitry assisting or otherwise associated with the processor) may be in communication with the memory 121 via a bus for passing information among components of the apparatus. The memory 121 may be non-transitory and may include, for example, one or more volatile and/or non-volatile memories. For example, the memory 121 may be an electronic storage device (e.g., a computer readable storage medium). In various embodiments, the memory 121 may be configured to store information, data, content, applications, instructions, or the like, for enabling the apparatus to carry out various functions in accordance with example embodiments of the present disclosure. It will be understood that the memory 121 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 121 may be configured to store imaging data captured by the imaging device of the loading operation monitoring apparatus 100, corresponding data generated by the controller 120 of the loading operation monitoring apparatus 100, timestamp data, location data, historical data and/or the like, associated with a loading operation associated with the loading space.

The processor 122 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 122 may be configured to execute instructions stored in the memory 121 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 120 may include input-output circuitry 123 that may, in turn, be in communication with the processor 122 to provide output to a user and, in some embodiments, to receive input such as a command provided by the user. The input-output circuitry 123 may comprise a user interface, such as a graphical user interface (GUI), and may include a display that may include a web user interface, a GUI application, a mobile application, a client device, or any other suitable hardware or software. In some embodiments, the input-output circuitry 123 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, or a combination thereof), or other input-output mechanisms. The processor 122, input-output circuitry 123 (which may utilize the processing circuitry), or both may be configured to control one or more functions of one or more user interface elements through computer-executable program code instructions (e.g., software, firmware) stored in a non-transitory computer-readable storage medium (e.g., memory 121). Input-output circuitry 123 is optional and, in some embodiments, the controller 120 may not include input-output circuitry. For example, in various embodiments, the controller 120 may generate one or more alert signals (e.g., data) to be transmitted to one or more other devices with which one or more authorized users (a manager, safety coordinator, and/or the like) directly interact and cause the one or more alert signals to be transmitted at the one or more other devices.

The communication circuitry 124 may be a device or circuitry embodied in either hardware or a combination of hardware and software that is configured to receive and/or transmit data from/to a network and/or any other device, circuitry, or module in communication with the controller 120. For example, the communication circuitry 124 may be configured to communicate with one or more computing devices via wired (e.g., USB) or wireless (e.g., Bluetooth, Wi-Fi, cellular, and/or the like) communication protocols. For example, in various embodiments, the communication circuitry 124 may be configured to facilitate data communication between an exemplary loading operation monitoring apparatus 100 and one or more external computing devices via wired (e.g., USB, ethernet, and/or the like) and/or wireless (e.g., Bluetooth, Wi-Fi, cellular, and/or the like) communication protocols.

In various embodiments, the processor 122 may be configured to communicate with the movement control circuitry 125. The movement control circuitry 125 may be a device or circuitry embodied in either hardware or a combination of hardware and software that is configured to facilitate an operation of a movable body by generating a control signal configured to operate a drive mechanism of the movable body. In various embodiments, the movement control circuitry 125 may be configured to generate the noted control signal to operate a drive mechanism of the movable body periodically during a loading operation and/or in in response to an interaction of an operator with the loading space (e.g., an operator entering the loading space of a carrier, an operator leaving a loading space of a carrier). In various embodiments, the movable body control circuitry may be configured to receive from the operator presence detection circuitry 128, one or more signals that indicates the entrance of an operator to the loading space and/or exit of the operator from the loading space.

In various embodiments, the movement control circuitry 125 may be configured to receive a first control signal (e.g., periodically during a loading operation and/or in in response to an interaction of an operator with the loading space) and, in response, transmit a corresponding signal to one or more circuitries of the controller 120, such as, for example, the imaging device position circuitry 127, the operator presence detection circuitry 128, and/or the alert management circuitry 129, in order to facilitate detection of a loading condition (e.g., unsatisfactory loading condition) based at least in part on the loading arrangement of objects being placed within a loading space by one or more operators.

In various embodiments, the processor 122 may be configured to communicate with the imaging device position circuitry 127. The imaging device position circuitry 127 may be a device and/or circuitry embodied in either hardware or a combination of hardware and software that is configured to receive, process, generate, and/or transmit data, such as one or more signals received from the distance measuring device 140. In various embodiments, the imaging device position circuitry 127 may be configured to determine a position of the imaging device within the loading space relative to a reference point. In various embodiments, the reference point may comprise the front wall of the loading space. For example, the imaging device position circuitry 127 may be configured to process the one or more signals received from the distance measuring device 140 to determine the position of the imaging device within the loading space relative to the front wall of the loading space.

In various embodiments, the processor 122 may be configured to communicate with the image processing circuitry 126. The image processing circuitry 126 may be a device and/or circuitry embodied in either hardware or a combination of hardware and software that is configured to receive, process, generate, and/or transmit data (e.g., imaging data), such as one or more images, videos, and/or the like captured by an imaging device 110 of the exemplary loading operation monitoring apparatus 100, 100', 100". In various embodiments, the image processing circuitry 126 may be further configured to analyze the one or more images captured by the imaging device 110 using at least one processing technique to determine one or more characteristics of a condition captured in the one or more images, such as, for example, a proximity (e.g., a distance) between two adjacent boxes, a proximity between the side walls to adjacent objects, a proximity between the top wall (e.g., ceiling) to adjacent objects below the top wall at different locations within the loading space, a proximity between the front wall to adjacent objects, a relative height of the contents (e.g., height of stacked objects) of a first location within the loading space to a second location within the loading space, volume of space between objects, and/or the like.

The image processing circuitry 126 may be configured to determine a space utilization measure (e.g., volume of space utilized) in the loading space (e.g., 80% space utilization, 20% space utilization, and/or the like) based at least in part on the noted one or more characteristics of a condition captured in the one or more images, as described above. Further still, in various embodiments, the image processing circuitry 126 may be configured to detect a loading condition based at least in part on the determined space utilization measure. As a non-limiting example, in various embodiments, a loading condition may be detected based at least in part on comparing the determined space utilization measure to a space utilization threshold, wherein, a space utilization measure that satisfies the space utilization threshold may be deemed a satisfactory loading condition and a space utilization measure that fails to satisfy the space utilization threshold may be deemed a non-satisfactory loading condition.

Further still, in various embodiments, the image processing circuitry 126 may be further configured to analyze the one or more images captured by the imaging device 110 to detect an operator presence within a loading space of a carrier, such as, for example, using one or more machine learning techniques and/or one or more image processing techniques. Furthermore, in various embodiments, the image processing circuitry 126 may be further configured to analyze the one or more images captured by the imaging device 110 to detect safety conditions (e.g., dock door status (e.g., open or closed)). Further still, in various embodiments, the image processing circuitry 126 may be further configured to analyze the one or more images captured by the imaging device 110 to detect an equipment status within a loading space of a carrier, such as, for example, using one or more machine learning techniques and/or one or more image processing techniques.

In various embodiments, for example, upon processing various imaging data captured by the imaging device 110, the image processing circuitry 126 may be configured to generate corresponding data that may be stored by the loading operation monitoring apparatus 100, 100', 100" (e.g., at the imaging device data repository 107 associated therewith) in a supported format that facilitates interaction therewith and/or retrieval thereof by the loading operation monitoring apparatus 100, 100', 100" as part of one or more machine learning operations. In various embodiments, as a non-limiting illustrative example, the one or more machine learning techniques used by the image processing circuitry 126 to determine a loading space utilization within a loading space 21 of a carrier may comprise using deep supervised learning with one or more labeled datasets of one or more known characteristics and/or conditions, such as, for example, known distances, arrangements, profiles, materials, colors, depths, and/or any other data generated, transmitted, and/or received by the controller 120.

In various embodiments, the image processing circuitry 126 may send and/or receive imaging data captured by the imaging device 110 and/or corresponding data associated therewith generated in a supported format by the image processing circuitry 126 to and/or from the imaging device data repository 107.

In various embodiments, the processor 122 may be configured to communicate with the alert management circuitry 129. The alert management circuitry 129 may be a device or circuitry embodied in either hardware or a combination of hardware and software that is configured to, upon a select loading condition associated with a loading space being detected by the exemplary loading operation monitoring apparatus, cause one or more alert signals corresponding to the detected loading condition to be transmitted from an operating condition indicator of the exemplary loading operation monitoring apparatus. As described herein, the alert management circuitry 129 may facilitate transmission (e.g., emission, display, and/or any other perceivable means of signal communication) of an exemplary alert signal comprising an audio and/or visual signal corresponding to a detected loading condition that, upon being transmitted from the operating condition indicator, may embody a perceivable indication of the loading condition (e.g., a light, a sound, a message, and/or the like, or any combination thereof) and/or an instructional message corresponding to the detected loading condition. For example, the alert management circuitry 129 may generate an indicator signal corresponding to the detected loading condition and may cause the indicator signal to be transmitted to the operating condition indicator for transmission therefrom as one or more audio and/or visual alert signals embodying an indication of the loading condition detected by the loading operation monitoring apparatus. As described herein, the alert management circuitry 129 may be configured to facilitate transmission of a unique alert signal depending on the loading condition that is detected by the loading operation monitoring apparatus 100, such as, for example, a first alert signal having a first signal configuration that corresponds to a unsatisfactory loading condition, a second alert signal having a second signal configuration that corresponds to a satisfactory loading condition, and/or the like.

In various embodiments, an exemplary loading operation monitoring apparatus 100, 100', 100" may be configured with, or in communication with, an imaging device data repository 107. The imaging device data repository 107 may be stored, at least partially on the memory 121 of the system. In some embodiments, the imaging device data repository 107 may be remote from, but in connection with, the apparatus 100, 100', 100'. The imaging device data repository 107 may contain information, such as images relating to one or more loading spaces. In some embodiments, the apparatus 100, 100', 100" may also use machine learning for detecting one or more conditions, statuses, and/or the like associated with a loading space and/or loading environment in order to facilitate the detection of a loading condition associated with the loading space, such that the apparatus 100 may use a reference database, such as the imaging device data repository 107, to initially train the apparatus 100, 100', 100" and then may be configured to detect a loading condition without referencing the imaging device data repository 107 or other reference databases. For example, in various embodiments, a controller 120 may be configured to execute a feedback loop, wherein one or more imaging data and corresponding space utilization data and/or determined characteristics (associated with the imaging data may define one or more inputs into a machine learning model in order to increase a rate of machine learning associated with the one or more machine learning techniques, as described herein.

Having described example systems, apparatuses, environments, data flows in accordance with the present disclosure, example processes in accordance with the present disclosure will now be discussed. It will be appreciated that each of the flowcharts depicts an example computer-implemented process that may performed by one or more of the apparatuses, systems, devices, and/or computer program products described herein, for example using one or more of the specially configured components thereof. The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

As described herein, in various embodiments, an exemplary loading operation monitoring apparatus may be configured to detect a loading condition of a loading space based at least in part on captured imaging data of the loading space. In particular, as described herein, an exemplary loading operation monitoring apparatus may be configured to detect a loading condition within a loading space of a carrier. For example, referring now to FIG. 5, a flowchart of an exemplary methods 500 for detecting a loading condition of loading space of a carrier based at least in part on captured imaging data of the loading space. In some embodiments, one or more operations of the illustrated exemplary method 500 may be executed by controlling a loading operation monitoring apparatus in accordance with one or more example embodiments described herein. For example, various operations discussed below with respect to exemplary method 500 may be carried out using various components of an exemplary loading operation monitoring apparatus, such as, for example, an exemplary loading operation monitoring apparatus 100, 100', 100" as described above in reference to FIGS. 1-4. In various embodiments, an exemplary loading operation monitoring apparatus utilized to execute one or more operations of exemplary methods 500 may comprise an imaging device, a movable body, a distance measuring device, and a controller, including one or more processors. In various embodiments, an exemplary loading operation monitoring apparatus may additionally comprise a loading condition indicator.

In various embodiments, although various steps described herein with respect to exemplary method 500 may be described, illustrated, and/or otherwise disclosed for illustrative purposes as sequential steps (e.g., operations) executed in series to facilitate execution of the exemplary method, it should be understood that at least a portion of the exemplary methods 500 may comprise synchronous steps that may be carried out (e.g., by an exemplary loading operation monitoring apparatus) at least substantially simultaneously. For example, in various embodiments, a loading condition may be detected at an at least substantially singular instance based on a plurality of data outputs corresponding to a plurality of loading configurations (e.g., positions, orientations, proximity, depth, and/or the like) as captured by an exemplary imaging device in association with at least substantially the same instance. For example, at least a portion of the exemplary methods described herein may be facilitated by a machine learning model wherein an artificial intelligence-driven device (e.g., the controller of an exemplary loading operation monitoring apparatus) may be utilized to at least substantially minimize the number of asynchronous detection operations and/or corresponding determinations required in order for a loading condition to be detected.

As illustrated in FIG. 5, exemplary method 500, at Block 502, may include identifying via a controller, commencement of a loading operation. In some embodiments, a loading operation commencement may be identified based at least in part on receiving, via a controller associated with an exemplary loading operation monitoring apparatus, a notification (e.g., a signal, a message, and/or the like) indicative of a start of a loading operation associated with a loading space of a carrier. For example, in various embodiments, a loading operation commencement may be detected by an exemplary loading operation monitoring apparatus based at least in part on a detected operator presence status and/or detected carrier presence status. For example, an exemplary loading operation monitoring apparatus may determine, based at least in part on one or more signals and/or imaging data, received from a sensor device (e.g., proximity sensor, RGB camera device, and/or the like), wherein the controller may be configured to analyze the one or more signals and/or imaging data to determine a loading operation commencement (e.g., start of a loading operation). In various embodiments, a loading operation may describe the process of placing (e.g., by human operators) objects within a loading space of a carrier (e.g., container, truck, trailer, lorry, tipper, and/or the like) for shipment to one or more locations (e.g., one or more destinations). In some embodiments, the noted one or more signals and/or imaging data may be generated by a sensor device located proximate to a loading environment such as a loading dock, wherein the sensor device may generate a signal and/or imaging data in response to presence of an operator and/or a carrier.

At Block 504, exemplary method 500 may further include causing, via the controller, a movable body having an imaging device secured thereto to be inserted within the loading space.

At Block 506, exemplary method 500 may further include capturing, via an imaging device secured to a movable body and configured to move between a first location and a second location within the loading space via operation of the movable body, imaging data of the loading space and the contents (e.g., objects) of the loading space, wherein the imaging data comprise imaging data of objects within the field of view of the imaging device at an instance during movement of the imaging device, and wherein the distance between the first location and the second location may comprise the length of the loading space of the carrier. For example, the imaging data may be captured by the imaging device of an exemplary loading operation monitoring apparatus.

In various embodiments, a controller may cause the imaging device to capture images at intervals along the length of the loading space based at least in part on the field of view of the imaging device and the length of the loading space of the carrier (e.g., distance from a front wall of the loading space to the rear of the loading space). For example, the controller may be configured to the determine, based at least in part on the length of the loading space and the field of view of the imaging device, intervals along the length of the loading space with respect to which the imaging device is caused, by the controller, to capture images in order to efficiently and effectively obtain imaging data that encompass substantially the entire loading space. For example, the controller may be configured to determine, based at least in part on the length of the loading space and the field of view of the imaging device, an optimal number of images (e.g., frames) to capture and the distance/interval between each captured image. For example, in various embodiments, the controller may be configured to cause the imaging device to capture images at intervals such that the imaging data between consecutive images overlap. For example, in various embodiments, upon detecting the optimal number of images to capture, and the optimal distance between each image capturing operation, the controller causes the imaging device to move within the loading space in a stepwise/step distance fashion, wherein the controller causes the imaging device to capture an image at one or more intervals during movement within the loading space based at least in part on the determined optimal number of images and distance between images. For example, the controller may be configured to cause the imaging device to capture N number of images along a length of the loading space, wherein the number of images is determined based at least in part on the distance between the imaging device and the front wall of the loading space.

In various embodiments, the controller may determine the length of the carrier based at least in part on one or more signals and/or data, received from a sensor device (e.g., range sensor device), that is indicative of the position of the distance between a front wall of the loading space and the rear of the loading space. In various embodiments, the controller may cause the imaging device to capture imaging data of the content (e.g., objects) of the loading space based at least in part on one or more signals and/or data received from the sensor device (e.g., range sensor device) that is indicative of the distance between the imaging device and the front wall at an instance. In various embodiments, the controller may be configured to cause the movable body to be driven in, flown in, moved in, inserted in, positioned within and/or the like the loading space. In an example embodiment, the movable body may comprise an extendable beam, wherein the controller may cause the extendable beam to extend, from a rear end of the loading space into the loading space (e.g., in response to commencement of a loading operation), and cause the imaging device to capture imaging data at the determined locations as the imaging device moves from a first location (e.g., rear of the loading space) to a second location (e.g., front of the loading space) via movement of the extendable beam. In another example embodiment, the movable body may comprise a carriage beam, wherein the controller may cause the carriage associated with the carriage beam (e.g., temporarily located within the loading space) to move from a first location (e.g., a rear end of the beam of the carriage beam) to a second location (e.g., a front end of the beam), and cause the imaging device, secured to the carriage, to capture imaging data at the determined locations as the imaging device moves from the first location (e.g., rear of the loading space) to a second location (e.g., front of the loading space) via movement of the carriage. In yet another example embodiment, the movable body may comprise a flying object (e.g., a drone), wherein the controller may be configured to, in response to detecting a loading operation commencement, cause the flying object to be driven (e.g., inserted) into the loading space, and also cause the imaging device at the determined locations within the loading space. In various embodiments, the In various embodiments, the imaging data captured by the imaging device of an exemplary loading operation monitoring apparatus may be used to monitor the loading operation to determine space utilization (e.g., volume of space utilized) of the loading space and to detect a loading condition. For example, the imaging data may comprise information such as proximity information and depth information associated with the objects within the loading space, and the imaging device may be caused to capture imaging data of the loading space, during a loading operation, periodically and/or in response to operator presence condition (e.g., entrance of operator into the loading space or exit of operator from the loading space), wherein the image may comprise a map (e.g., 3D map) of the content of substantially the entire loading space.

At Block 508, exemplary method 500 may further include determining, based at least in part on the imaging data, a space utilization measure (e.g., volume of space utilized). As described herein, the imaging data captured by the imaging device may be processed by the exemplary loading operation monitoring apparatus (e.g., a controller thereof) to detect an unused volume space based at least in part on the imaging data that comprise the depth of objects relative to the imaging device, the proximity of a given object to adjacent object, and/or the like. For example, one or more machine learning techniques and/or one or more image processing techniques may be executed with respect to the imaging data to detect the loading space utilization.

At Block 510, exemplary method 500 may further include detecting, based at least in part on the space utilization measure, a loading condition, wherein the loading condition may include, as a non-limiting example, a satisfactory space utilization condition, unsatisfactory space utilization condition, and/or the like. As a non-limiting example, in various embodiments, a loading condition may be detected based at least in part on comparing the determined space utilization measure (e.g., volume of space utilized) to a space utilization threshold, wherein, a space utilization measure that satisfies the space utilization threshold may be deemed a satisfactory loading condition and a space utilization measure that fails to satisfy the space utilization threshold may be deemed a non-satisfactory loading condition. In various embodiments, one or more image processing operations may be executed with respect to the space utilization measure to detect the loading condition. Additionally, and/or alternatively, in various embodiments, one or more machine learning techniques may be executed with respect to the space utilization measure to detect the loading condition.

At Block 512, exemplary method 500 may further include upon detecting unsatisfactory loading condition, transmitting from the operating condition indicator, a first alert signal embodying an indicator that the loading space is being underutilized. As described herein, upon detecting unsatisfactory space utilization condition associated with a loading space, an exemplary loading operation monitoring apparatus may generate a first alert signal that is configured to be transmitted from a loading condition indicator of the loading operation monitoring apparatus as an indication of the unsatisfactory loading condition to the operator and/or one or more people (e.g., supervisor, manager, and/or the like). For example, upon detecting an unsatisfactory loading condition, an exemplary loading operation monitoring apparatus may cause a first alert signal corresponding to the unsatisfactory loading condition to be transmitted from the loading condition indicator as a visual signal, such as, for example, a selective lighting of a light element (e.g., an LED) of the operating condition indicator that is configured to emit light of a particular color corresponding specifically to the safe operating condition (e.g., a green light).

It should be understood that, in various other embodiments, an exemplary loading operation monitoring apparatus may cause an alert signal to be transmitted for each loading condition detection and/or a subset of loading conditions. While various embodiments described herein discuss a single imaging device, it should be understood that an exemplary loading operation monitoring apparatus may comprise a plurality of imaging devices. Furthermore, while various embodiments described herein discuss a single distance measuring device, it should be understood that an exemplary loading operation monitoring apparatus may comprise a plurality of distance measuring devices. Moreover, while various embodiments describe herein discuss a single controller, it should be understood that an exemplary loading operation monitoring apparatus may comprise a plurality of controllers.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for monitoring a loading operation, the apparatus comprising:

a movable body configured to be inserted in a loading space of a carrier during a loading operation and proximate to an upper portion of the loading space;

an imaging device secured to the movable body, the imaging device configured to capture imaging data of the loading space, wherein the captured imaging data comprise a three-dimensional (3D) map of the loading space;

a distance measuring device secured to the movable body, the distance measuring device configured for measuring a distance between the imaging device and a front wall of the loading space; and a controller configured to receive the imaging data captured by the imaging device, wherein the controller comprise one or more processors configured to detect a loading condition of the loading space of the carrier based at least in part on the imaging data, wherein the controller is configured to: (i) determine a height of contents of a particular area of the loading space during the loading operation (ii) and in response to determining that the height of the contents of the particular area of the loading space satisfies a content height threshold: (a) determine that loading of the particular area of the loading space has been completed, and (b) cause the movable body when re-inserted into the loading space to move a second length that is less than a first length.

2. The apparatus of claim 1, wherein the controller is further configured to monitor the loading operation of the loading space by at least substantially continuously capturing the imaging data.

3. The apparatus of claim 1, wherein the controller is further configured to monitor the loading operation of the loading space by at least periodically capturing the imaging data.

4. The apparatus of claim 1, wherein:

the movable body comprises an extendable beam, the imaging device is secured to a first end of the extendable beam, and the imaging device is configured to move via extension of the extendable beam.

5. The apparatus of claim 1, wherein:

the movable body comprises a carriage secured to a beam, the carriage is configured to move along a length of the beam, and the imaging device is secured to the carriage and configured to move along a length of the loading space via movement of the carriage.

6. The apparatus of claim 1, wherein the movable body comprises a flying object.

7. The apparatus of claim 6, wherein the flying object comprises a drone.

8. The apparatus of claim 1, wherein the distance measuring device comprises a range sensor.

9. The apparatus of claim 1, wherein a field of view of the imaging device is orientated substantially perpendicular relative to a bottom wall of the loading space.

10. The apparatus of claim 1, wherein a field of view of the imaging device is orientated substantially parallel relative to a bottom wall of the loading space.

11. The apparatus of claim 1, wherein the imaging device is a 3D camera configured to capture 3D point cloud images.

12. The apparatus of claim 1, wherein the controller is configured to cause the imaging device to capture N number of images along a length of the loading space, wherein the N number of images is determined based at least in part on the distance between the imaging device and the front wall of the loading space.

13. The apparatus of claim 1, wherein the controller is configured to determine a space utilization measure based at least in part on the imaging data, wherein the loading condition is detected based at least in part on comparing the space utilization measure to a space utilization threshold.

14. The apparatus of claim 1, further comprising a loading condition indicator in electronic communication with the controller such that the loading condition indicator is configured to receive one or more indicator signals corresponding to the detected loading condition from the controller and, in response, transmit an alert signal corresponding to the detected loading condition based on the one or more indicator signals, the alert signal embodying an indicator of the detected loading condition.

15. The apparatus of claim 1, wherein the controller is configured to process the imaging data captured by the imaging device by executing one or more machine learning operations.

* * * * *